United States Patent
Isono

(10) Patent No.: US 12,534,636 B2
(45) Date of Patent: Jan. 27, 2026

(54) EXTERIOR WINDOW FILM

(71) Applicant: LINTEC Corporation, Tokyo (JP)

(72) Inventor: Toru Isono, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 18/851,654

(22) PCT Filed: Mar. 29, 2023

(86) PCT No.: PCT/JP2023/012936
§ 371 (c)(1),
(2) Date: Sep. 26, 2024

(87) PCT Pub. No.: WO2023/190740
PCT Pub. Date: Oct. 5, 2023

(65) Prior Publication Data
US 2025/0206977 A1    Jun. 26, 2025

(30) Foreign Application Priority Data

Mar. 31, 2022    (JP) ................................ 2022-058443

(51) Int. Cl.
*C09D 133/10* (2006.01)
*C09D 5/32* (2006.01)
(Continued)

(52) U.S. Cl.
CPC ............. *C09D 133/10* (2013.01); *C09D 5/32* (2013.01); *C09D 7/48* (2018.01); *C09D 7/63* (2018.01)

(58) Field of Classification Search
CPC .......... C09D 133/10; C09D 5/32; C09D 7/48; C09D 7/63
(Continued)

(56) References Cited

U.S. PATENT DOCUMENTS

2016/0221870 A1\* 8/2016 Arita ....................... C03C 25/10
2025/0206977 A1\* 6/2025 Isono ..................... B32B 27/00

FOREIGN PATENT DOCUMENTS

| JP | 2001-18334 A | 1/2001 |
| JP | 2012-206378 A | 10/2012 |

(Continued)

OTHER PUBLICATIONS

JP 2014137575 A, An English Machine Translation. (Year: 2014).\*

*Primary Examiner* — Betelhem Shewareged
(74) *Attorney, Agent, or Firm* — Schwabe Williamson & Wyatt

(57) ABSTRACT

The exterior window film according to the present invention comprises a substrate, a hard coat layer provided on one surface side of the substrate, and a pressure-sensitive adhesive layer provided on the opposite surface side of the substrate from the side provided with the hard coat layer. The hard coat layer is composed of a material containing a (meth)acrylate-based resin having a urethane (meth)acrylate as a constituent component, a hindered amine light stabilizer, and an ultraviolet absorber. The exterior window film according to the present invention is characterized in that, relative to 100.0 parts by mass of the (meth)acrylate-based resin, a proportion of the hindered amine light stabilizer is 2.0 parts by mass or more and 15.0 parts by mass or less, and a proportion of the ultraviolet absorber is 5.0 parts by mass or more and 30.0 parts by mass or less.

11 Claims, 3 Drawing Sheets

(51) Int. Cl.
  *C09D 7/48* (2018.01)
  *C09D 7/63* (2018.01)
(58) Field of Classification Search
  USPC .......................................................... 428/201
  See application file for complete search history.

(56) References Cited

FOREIGN PATENT DOCUMENTS

| | | |
|---|---|---|
| JP | 2013-180519 A | 9/2013 |
| JP | 2014-137575 A | 7/2014 |
| JP | 2019-48444 A | 3/2019 |
| WO | 2018/173979 A | 9/2018 |

* cited by examiner

EXTERIOR WINDOW FILM

RELATED APPLICATIONS

This application is a US national phase application, which claims priority to PCT Application No. PCT/JP2023/012936, filed Mar. 29, 2023, which claims priority to JP Application No. 2022-058443, filed Mar. 31, 2022, which are incorporated herein by reference in their entireties.

TECHNICAL FIELD

The present invention relates to an exterior window film.

RELATED ART

A window film is a pressure-sensitive adhesive film that is used to a window glass of vehicles such as automobiles, ships and trains, and buildings such as houses, condominiums and office buildings. The window film is widely used for purposes of shielding against ultraviolet rays and/or infrared rays in sunlight, protecting privacy, preventing crime, preventing glass from shattering, and for decorative purposes.

For example, the window film has a configuration to include a transparent substrate, a hard coat layer provided on one surface side of the substrate, and a pressure-sensitive adhesive layer provided on the opposite surface side of the substrate from the side provided with the hard coat layer. Furthermore, the window film of which the pressure-sensitive adhesive layer contains an ultraviolet absorber to efficiently cut ultraviolet rays is also used (for example, Patent Document 1).

In an interior window film that is applied to an interior surface of a window glass, sunlight hits the window glass/the pressure-sensitive adhesive layer/the substrate/the hard coat layer/the interior in this order. In this case, since ultraviolet rays can be blocked at the pressure-sensitive adhesive layer so as to protect the hard coat layer from the ultraviolet rays, deterioration of the hard coat layer due to the ultraviolet rays can be suppressed.

On the other hand, for customers who wish to apply a window film from the outside of a window due to a structure of a building or the like, an exterior window film that can be applied to an exterior surface of the window glass has also been developed.

In such an exterior window film, sunlight hits the hard coat layer/the substrate/the pressure-sensitive adhesive layer/the window glass/the interior in this order. Therefore, ultraviolet rays cannot be blocked at the pressure-sensitive adhesive layer so as to protect the hard coat layer from the ultraviolet rays, resulting in the deterioration of the hard coat layer due to the ultraviolet rays.

In the case of the exterior window film, factors such as rain, wind, and changes in temperature can cause the deterioration of the hard coat layer in addition to sunlight.

Furthermore, since a crane or the like is used when installing the window film from the outside, there is a desire to transport as many window films as possible to the installation location in one operation.

Therefore, each of the window films is transported in a rolled state so that the hard coat layer of the window film is on the outside. At this time, cracks must not occur in the hard coat layer.

If the cracks occur in the hard coat layer, problems such as decreased transparency, decreased appearance, and decreased performance may happen.

The Patent Document 1 is WO 2018-173979

SUMMARY OF THE INVENTION

An object of the present invention is to provide an exterior window film with a hard coat layer, the exterior window film having excellent weather resistance, preventing occurrence of cracks in the hard coat layer when wound into a roll shape, and ensuring transparency.

The above object can be achieved by the present invention having the following configurations. Note that in the present invention, these configurations can be combined in any desired manner.

An exterior window film according to the present invention includes a substrate, a hard coat layer provided on one surface side of the substrate, and a pressure-sensitive adhesive layer provided on the opposite surface side of the substrate from the side provided with the hard coat layer,
  in which the hard coat layer is composed of a material containing a (meth)acrylate-based resin having a urethane (meth)acrylate as a constituent component, a hindered amine light stabilizer, and an ultraviolet absorber, and
  in which relative to 100.0 parts by mass of the (meth)acrylate-based resin, a proportion of the hindered amine light stabilizer is 2.0 parts by mass or more and 15.0 parts by mass or less, and a proportion of the ultraviolet absorber is 5.0 parts by mass or more and 30.0 parts by mass or less.

In the present invention, it is preferable that the hard coat layer contains a compound having a benzophenone structure and a compound having a hydroxyphenyltriazine structure as the ultraviolet absorber.

In the present invention, it is preferable that a ratio of a content of the compound having the benzophenone structure to a content of the compound having the hydroxyphenyltriazine structure in the hard coat layer is between 1.0:2.0 and 2.0:1.0 by mass ratio.

In the present invention, it is preferable that the (meth)acrylate-based resin has a polymerized structure of the urethane (meth)acrylate by a photopolymerization initiator.

In the present invention, it is preferable that the photopolymerization initiator is a triphenylphosphine oxide-based compound. This is because an ultraviolet absorption wavelength of the triphenylphosphine oxide-based compound is on the longer wavelength side than that of the ultraviolet absorber.

In the present invention, it is preferable that the hard coat layer has a thickness of 0.1 µm or more and 20 µm or less.

In the present invention, it is preferable that the substrate is composed of a material containing polyester.

According to the present invention, it is possible to provide the exterior window film with the hard coat layer, the exterior window film having the excellent weather resistance, preventing occurrence of cracks in the hard coat layer when wound into a roll shape, and ensuring the transparency.

DETAILED DESCRIPTION OF THE PREFERRED EMBODIMENTS

Hereinafter, preferred embodiments according to the present invention will now be described in detail.

[1] Window Film

Figure 1:
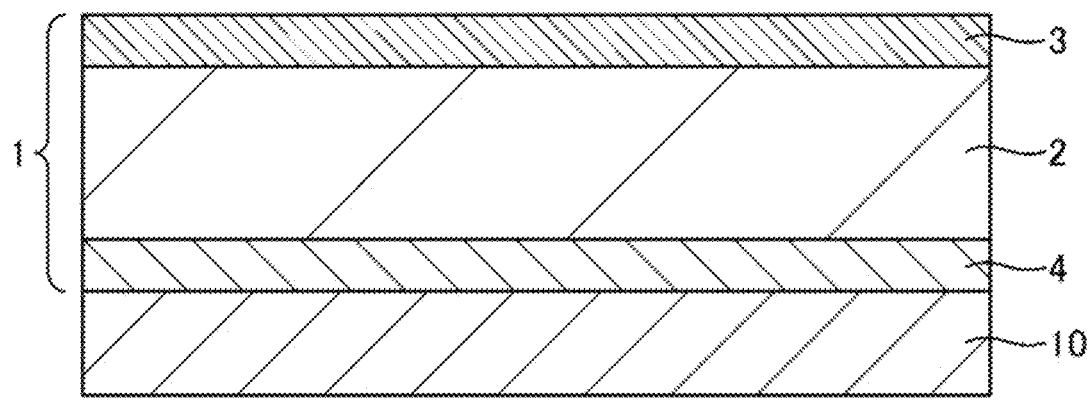
FIG. 1 is a cross-sectional view showing an example configuration of an exterior window film according to the present invention.
Figure 2:
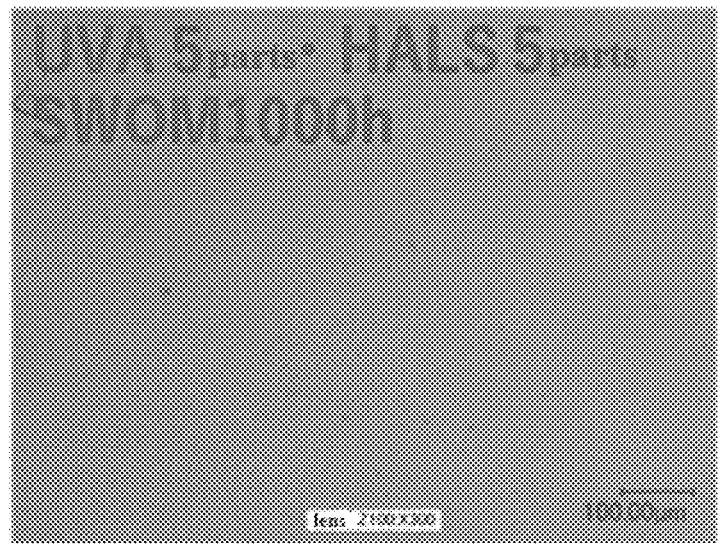
FIG. 2 is a micrograph of a surface of an exterior window film of Example 1 after performing an accelerated weather resistance test.
Figure 3:
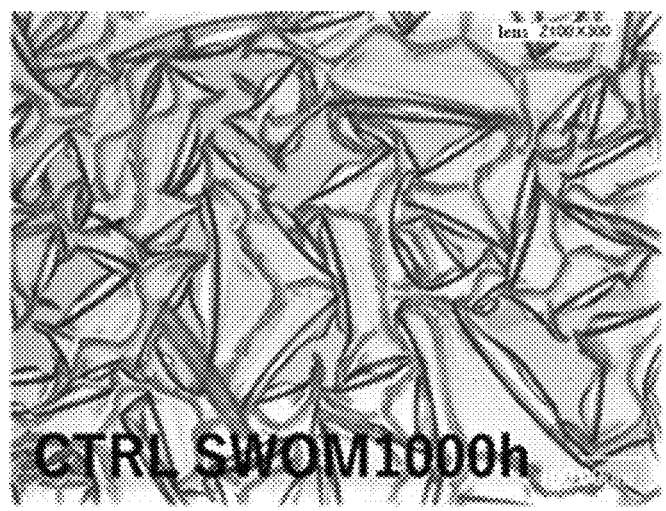
FIG. 3 is a micrograph of a surface of an exterior window film of Comparative Example 1 after performing the accelerated weather resistance test.
Figure 4:
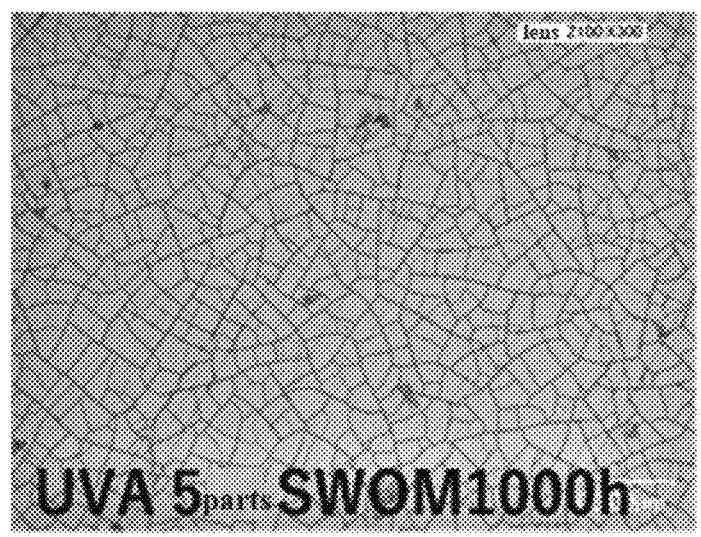
FIG. 4 is a micrograph of a surface of an exterior window film of Comparative Example 3 after performing the accelerated weather resistance test.
Figure 5:
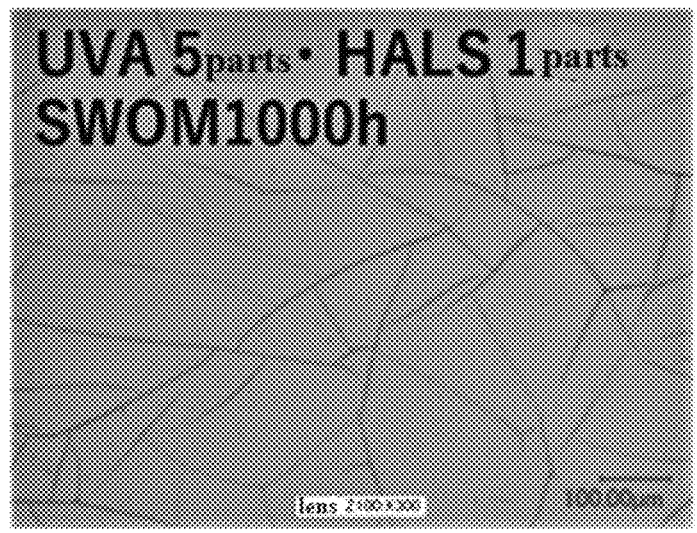
FIG. 5 is a micrograph of a surface of an exterior window film of Comparative Example 6 after performing the accelerated weather resistance test.

FIG. 1 is a cross-sectional view showing an example configuration of an exterior window film according to the present invention.

An exterior window film 1 includes a substrate 2, a hard coat layer 3 provided on one surface side of the substrate 2 and a pressure-sensitive adhesive layer 4 provided on the opposite surface side of the substrate 2 from the side provided with the hard coat layer 3. The hard coat layer 3 is composed of a material containing a (meth)acrylate-based resin having a urethane (meth)acrylate as a constituent component, a hindered amine light stabilizer, and an ultraviolet absorber. Relative to 100.0 parts by mass of the (meth)acrylate-based resin, a proportion of the hindered amine light stabilizer is 2.0 parts by mass or more and 15.0 parts by mass or less, and a proportion of the ultraviolet absorber is 5.0 parts by mass or more and 30.0 parts by mass or less.

Thus, in the hard coat layer 3, the (meth)acrylate-based resin contains the urethane (meth)acrylate as the constituent component. This makes it possible to impart flexibility to the hard coat layer 3 and contribute to prevention of occurrence of cracks in the hard coat layer 3 when the exterior window film 1 is wound into a roll shape.

Furthermore, the hard coat layer 3 contains the hindered amine light stabilizer, which contributes to improvement of light resistance of the exterior window film 1 and contributes to suppression of decrease in transparency of the exterior window film 1.

Furthermore, since the hard coat layer 3 contains the ultraviolet absorber, ultraviolet rays can be cut in the hard coat layer 3. As a result, it is possible to reduce a proportion of ultraviolet rays in the light transmitted through the exterior window film 1. Furthermore, in a state where the exterior window film 1 is applied to an adherend, ultraviolet rays can be cut at the hard coat layer 3 which is the outermost layer. This can also contribute to suppression of deterioration of the pressure-sensitive adhesive layer 4 and the substrate 2.

The proportion of the hindered amine light stabilizer is 2.0 parts by mass or more and 15.0 parts by mass or less, and the proportion of the ultraviolet absorber is 5.0 parts by mass or more and 30.0 parts by mass or less, relative to 100.0 parts by mass of the (meth)acrylate-based resin.

The hindered amine light stabilizer and the ultraviolet absorber are contained in the hard coat layer 3 in each of the predetermined proportions, thereby improving weather resistance of the exterior window film 1, preventing occurrence of cracks in the hard coat layer 3 when the film is wound into a roll shape, and ensuring the transparency of the exterior window film 1.

The excellent effects of the present invention can be obtained by the exterior window film 1 having the above-mentioned configurations. If the exterior window film 1 does not have the above-mentioned configurations, the excellent effects cannot be obtained.

For example, if the (meth)acrylate-based resin constituting the hard coat layer does not contain the urethane (meth)acrylate as the constituent component, it is not possible to sufficiently prevent occurrence of cracks in the hard coat layer when the exterior window film is wound into a roll shape.

Further, if the hard coat layer does not contain the hindered amine light stabilizer, the light resistance of the exterior window film is significantly deteriorated, and the transparency of the exterior window film 1 is significantly deteriorated.

Even in a case where the hard coat layer contains the hindered amine light stabilizer, if the proportion of the stabilizer is less than the lower limit value, the light resistance of the exterior window film cannot be sufficiently improved, even if the ultraviolet absorber is contained in a relatively high content percentage instead. As a result, it is not possible to sufficiently suppress the decrease in transparency of the exterior window film 1.

If the proportion of the hindered amine light stabilizer in the hard coat layer exceeds the upper limit value, there is a concern about segregation of the hindered amine light stabilizer toward the surface of the hard coat layer and poor appearance of the exterior window film.

Furthermore, if the hard coat layer does not contain the ultraviolet absorber, the weather resistance of the exterior window film is significantly deteriorated.

Even in a case where the hard coat layer contains the ultraviolet absorber, if the proportion of the ultraviolet absorber is less than the lower limit value, the weather resistance of the exterior window film cannot be sufficiently improved, even if the hindered amine light stabilizer is contained in a relatively high content percentage instead.

If the proportion of the ultraviolet absorber in the hard coat layer exceeds the upper limit value, ultraviolet radiation irradiated during a curing reaction of the urethane (meth) acrylate is excessively absorbed by the ultraviolet absorber, which may lead to poor curing of the urethane (meth) acrylate.

[1-1] Substrate

The substrate 2 has a function of supporting the hard coat layer 3 and the pressure-sensitive adhesive layer 4.

The substrate 2 may be composed of any material. Examples of the constituent material of the substrate 2 may include various resin materials. However, the substrate 2 is preferably composed of a material containing polyester, and more preferably composed mainly of polyester.

This improves handleability of the exterior window film 1 and improves workability such as applying the exterior window film 1 to an adherend. In addition, this improves durability of the exterior window film 1.

In this specification, the term "mainly" means that the content percentage is the highest in a target portion.

In particular, the content percentage of the polyester in the substrate 2 is preferably 90% by mass or more, and more preferably 95% by mass or more.

Examples of the polyester constituting the substrate 2 include polyethylene terephthalate and polybutylene terephthalate. Among these, polyethylene terephthalate is preferred.

This enhances the handleability of the exterior window film 1 and enhances the workability such as applying the exterior window film 1 to an adherend. In addition, this enhances the durability of the exterior window film 1. Furthermore, this improves adhesion between the hard coat layer 3 and the pressure-sensitive adhesive layer 4 which are composed of materials described below.

The substrate 2 may contain components other than those mentioned above.

Such components include, for example, a colorant, an antioxidant, an ultraviolet absorber, a light stabilizer, a softener, a modifier, a rust inhibitor, a filler, a surface lubricant, a corrosion inhibitor, a heat-resistant stabilizer, a lubricant, an antistatic agent, a polymerization inhibitor, a crosslinking agent, a catalyst, a leveling agent, a thickener, a dispersant, and the like. Among these, it is preferable that the substrate 2 contains the ultraviolet absorber. This can improve the light resistance of the substrate 2 itself and can also improve the light resistance of the exterior window film 1 overall. The ultraviolet absorber contained in the substrate 2 and the ultraviolet absorber contained in the hard coat layer 3 may be the same or different from each other, but it is preferable that they are different from each other. This makes it possible to remarkably exhibit the above-mentioned effects.

In particular, it is preferable that the substrate 2 is mainly composed of the polyethylene terephthalate and contains the ultraviolet absorber. This makes it possible to more remarkably exhibit the above-mentioned effects.

Examples of the ultraviolet absorber includes: a salicylic acid-based ultraviolet absorber such as p-t-butylphenyl salicylate or p-octylphenyl salicylate; a benzophenone-based ultraviolet absorber such as 2,4-dihydroxybenzophenone, 2-hydroxy-4-methoxybenzophenone, 2-hydroxy-4-methoxy-5-sulfobenzophenone, 2,2',4,4'-tetrahydroxybenzophenone or bis(2-methoxy-4-hydroxy-5-benzoylphenyl)methane; a benzotriazole-based ultraviolet absorber such as 2-(2'-hydroxy-5'-methylphenyl)benzotriazole or 2,2'-methylenebis[4-(1,1,3,3-tetramethylbutyl)-6-(2H-benzotriazol-2-yl)phenol]; a cyanoacrylate-based ultraviolet absorber such as ethyl-2-cyano-3,3'-diphenylacrylate; a benzoxazinone-based ultraviolet absorber such as 2-p-nitrophenyl-3,1-benzoxazin-4-one, 2-(p-benzoylphenyl)-3,1-benzoxazin-4-one, 2-(2-naphthyl)-3,1-benzoxazin-4-one, 2,2'-(p-phenylene)bis(3,1-benzoxazin-4-one) or 2,2'-(2,6-naphthylene)bis(3,1-benzoxazin-4-one); and an inorganic-based ultraviolet absorber such as titanium dioxide, cerium oxide, zinc oxide, iron oxide, or barium sulfate. One or more selected from these may be used in combination. Among these, the benzoxazinone-based ultraviolet absorber is preferable in that this can be melted and mixed with the polyethylene terephthalate. Further, examples of the benzoxazinone-based (organic-based) ultraviolet absorber include 2,2'-(1,4-phenylene)bis[4H-3,1-benzoxazin-4-one], 2,6-naphthalenebis(1,3-benzoxazin-4-one) and the like.

The substrate 2 may have substantially uniform composition throughout the entirety or may have portions each of which has composition different from the others. For example, the substrate 2 may be a laminate including a plurality of layers having portions, each of which has composition different from the others (for example, including a case where molecular weights of resin materials are different). The substrate 2 may also be composed of a gradient material whose composition changes obliquely along the thickness direction.

The substrate 2 may be subjected to a surface treatment to increase the adhesion between the hard coat layer 3 and the pressure-sensitive adhesive layer 4.

Such a surface treatment includes a corona treatment or a coating of an adhesion-promotion resin.

Examples of the adhesion-promotion resin include a polyester-based resin, a urethane-based resin, and an acrylic-based resin.

The thickness of the substrate 2 is not particularly limited, but is preferably 10 µm or more and 300 µm or less, more preferably 15 µm or more and 200 µm or less, and even more preferably 20 µm or more and 100 µm or less.

This results in the durability of the exterior window film 1 and improves the handleability of the exterior window film 1, facilitating a process such as application to an adherend. In addition, this improves a shape followability with respect to a curved adherend, effectively preventing occurrence of wrinkles and the like in the exterior window film 1.

[1-2] Hard Coat Layer

The hard coat layer 3 has more excellent abrasion resistance than the substrate 2. For example, the hard coat layer 3 has a function of improving the abrasion resistance of the exterior window film 1 overall.

This allows the exterior window film 1 to exhibit the excellent abrasion resistance after being applied to an adherend. In particular, the exterior window film 1 has a high possibility of contact or collision with sand, dust, and various flying objects. In this connection, the hard coat layer 3 is an important part for ensuring scratch resistance and sufficient durability even in such a use environment. This also effectively prevents the exterior window film 1 from being scratched during the process of applying the exterior window film 1 to an adherend.

In addition, the hard coat layer 3 is composed of a material containing a hindered amine light stabilizer and an ultraviolet absorber. This makes it possible to cut ultraviolet rays and reduce the proportion of the ultraviolet rays in the light transmitted through the exterior window film 1. Furthermore, in a state where the exterior window film 1 is applied to an adherend, the hard coat layer 3, which is the outermost layer, can cut ultraviolet rays. For this reason, the hard coat layer 3 can contribute to suppression of the deterioration of the pressure-sensitive adhesive layer 4 and the substrate 2, while the hard coat layer 3 has a function of improving the weather resistance of the exterior window film 1.

[1-2-1] (Meth)Acrylate-Based Resin

The hard coat layer 3 contains a (meth)acrylate-based resin having a urethane (meth)acrylate as a constituent component, that is, a polymerizable component.

Since the (meth)acrylate-based resin contains the urethane (meth)acrylate as the constituent component, it is possible to impart the flexibility to the hard coat layer 3. In particular, it is possible to impart the flexibility to the hard coat layer 3, and suitably prevent occurrence of cracks in the hard coat layer 3 by satisfying the predetermined content relationship between the hindered amine light stabilizer and the ultraviolet absorber described in detail below.

The urethane (meth)acrylate is an oligomer having at least a (meth)acryloyl group and a urethane bond and has a property of being polymerized and cured by irradiation with energy radiation.

The (meth)acrylate-based resin constituting the hard coat layer 3 may contain components other than the urethane (meth)acrylate. Examples of such components include (meth)acrylate having no urethane group.

In this regard, a proportion of the urethane (meth)acrylate in the (meth)acrylate-based resin constituting the hard coat layer 3 is preferably 10.0% by mass or more, more preferably 30.0% by mass or more, and even more preferably 50.0% by mass or more.

The content percentage of the (meth)acrylate-based resin in the hard coat layer 3 is preferably 50.0% by mass or more and 93.0% by mass or less, more preferably 60.0% by mass or more and 90.0% by mass or less, and even more preferably 70.0% by mass or more and 86.0% by mass or less.

When the hard coat layer 3 contains a plurality of types of (meth)acrylate-based resins, the sum of content percentages of these (meth)acrylate-based resins is considered as the content percentage of the (meth)acrylate-based resin in the hard coat layer 3.

[1-2-2] Hindered Amine Light Stabilizer

The hard coat layer 3 contains the hindered amine light stabilizer.

First, functions of the hindered amine light stabilizer will be described.

That is, the hindered amine light stabilizer has a function of returning the energy state of substances excited by irradiation with ultraviolet radiation to the ground state and releasing the returned energy as heat.

Therefore, it is possible to suppress chemical reactions of the substances excited by irradiation with ultraviolet radiation, and thus effectively suppress deterioration in the weather resistance such as yellowing of the exterior window film 1.

The hindered amine light stabilizer contained in the hard coat layer 3 has a function of improving the weather resistance of the hard coat layer 3 and suppressing deterioration of the properties over time due to light irradiation or the like.

The hindered amine light stabilizer has at least one group (hindered amine group) represented by the following Formula (1) in one molecule.

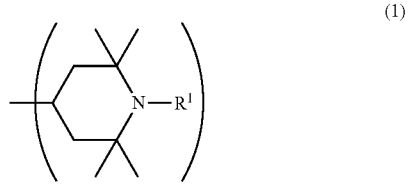

(1)

In Formula (1), $R^1$ represents a hydrogen atom, an alkyl group or an alkoxy group. Examples of the alkyl group include a methyl group, an ethyl group, a propyl group and a butyl group. Examples of the alkoxy group include a methoxy group and an ethoxy group.

When there are a plurality of groups represented by Formula (1) in one molecule, $R^1$ of the plurality of groups may be the same or different from each other.

Examples of such a hindered amine light stabilizer include: dimethyl succinate-1-(2-hydroxyethyl)-4-hydroxy-2,2,6,6-tetramethylpiperidine polycondensate; poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]; poly[{6-morpholino-s-triazine-2,4-diyl}{(2,2,6,6-tetramethyl-4-piperidyl)imino}hexamethylene{(2,2,6,6-tetramethyl-4-piperidyl)imino}]; N,N',N'',N'''-tetrakis(4,6-bis(butyl-(N-methyl-2,2,6,6-tetramethylpiperidin-4-yl)amino)triazin-2-yl)-4,7-diazadecane-1,10-diamine; bis(1,2,2,6,6-pentamethyl-4-piperidyl) [[3,5-bis(1,1-dimethylethyl)-4-hydroxyphenyl]methyl]butyl malonate; reaction product of cyclohexane and peroxide N-butyl 2,2,6,6-tetramethyl-4-piperidinamine-2,4,6-trichloro-1,3,5-triazine, and reaction product with 2-aminoethanol; decanedioic acid bis(2,2,6,6-tetramethyl-1-(octyloxy)-4-piperidyl) ester; reaction product of 1,1-dimethylethyl hydroperoxide with octane; a mixture of bis(1,2,2,6,6-pentamethyl-piperidyl)sebacate and methyl 1,2,2,6,6-pentamethyl-4-piperidyl)sebacate; a mixture of bis (1,2,2,6,6-pentamethyl-4-piperidyl)sebacate and methyl 1,2,2,6,6-pentamethyl-4-piperidyl)sebacate; bis(2,2,6,6-tetramethyl-4-piperidyl)sebacate, and the like. These may be used alone or in combination of two or more.

Among these, from the viewpoints of excellent performance as the light stabilizer and improvement of the weather resistance, it is preferable that $R^1$ in Formula (1) is a tertiary hindered amine group which is an alkyl group. The hindered amine light stabilizer having the tertiary hindered amine group is particularly excellent in the performance as the light stabilizer.

Furthermore, it is possible to remarkably exhibit the effects described above.

Examples of such a hindered amine light stabilizer include N,N',N'',N'''-tetrakis(4,6-bis(butyl-(N-methyl-2,2,6,6-tetramethylpiperidin-4-yl)amino)triazin-2-yl)-4,7-diazadecane-1,10-diamine, bis(2,2,6,6-tetramethyl-4-piperidyl)sebacate, a mixture of bis(1,2,2,6,6-pentamethyl-4-piperidyl)sebacate and methyl 1,2,2,6,6-pentamethyl-4-piperidyl)sebacate, and the like.

Such a hindered amine light stabilizer is commercially available, for example, from BASF corporation under the trade name "Tinuvin (registered trademark) 292" (a mixture of bis(1,2,2,6,6-pentamethyl-4-piperidyl)sebacate and methyl 1,2,2,6,6-pentamethyl-4-piperidyl)sebacate).

As mentioned above, the hindered amine light stabilizer is contained in the hard coat layer 3 in the proportion of 2.0 parts by mass or more and 15.0 parts by mass or less relative to 100.0 parts by mass of the (meth)acrylate-based resin. However, the proportion of the hindered amine light stabilizer relative to 100.0 parts by mass of the (meth)acrylate-based resin is preferably 3.0 parts by mass or more and 14.0 parts by mass or less, more preferably 4.0 parts by mass or more and 12.0 parts by mass or less, and even more preferably 5.0 parts by mass or more and 10.0 parts by mass or less.

This makes it possible to more remarkably exhibit the effects of the present invention described above.

The content percentage of the hindered amine light stabilizer in the hard coat layer 3 is preferably 1.5% by mass or more and 12.5% by mass or less, more preferably 2.2% by mass or more and 11.5% by mass or less, and even more preferably 4.0% by mass or more and 8.3% by mass or less.

This makes it possible to more remarkably exhibit the effects of the present invention described above.

When the hard coat layer 3 contains a plurality of types of hindered amine light stabilizers, the sum of content percentages of these stabilizers is considered as the content percentage of the hindered amine light stabilizer in the hard coat layer 3.

[1-2-3] Ultraviolet Absorber

The hard coat layer 3 contains the ultraviolet absorber.

The ultraviolet absorber has a function of preventing an influence of ultraviolet rays on a human body and an article by absorbing the ultraviolet rays and converting them into energy such as heat.

An absorption maximum wavelength of absorbance of the ultraviolet absorber preferably falls within 380 nm or less in the wavelength range of 200 nm or more and 500 nm or less in an acetonitrile solution having a concentration of 0.1% by mass.

In this regard, when there are a plurality of absorption maximum wavelengths in the wavelength range of 200 nm or more and 500 nm or less, it is sufficient that at least one of the absorption maximum wavelengths falls within the above range.

As a result, when ultraviolet radiation is irradiated, the acrylic-based polymer can be sufficiently cured without being inhibited by the ultraviolet absorber.

On the other hand, the lower limit value of the absorption maximum wavelength is preferably 280 nm or more from the viewpoint of preventing the influence of ultraviolet rays on a human body and an article.

Examples of the ultraviolet absorber include a benzophenone-based compound, a benzotriazole-based compound, a benzoate-based compound, a benzoxazinone-based compound, a triazine-based compound, a phenyl salicylate-based compound, a cyanoacrylate-based compound, and a nickel complex salt-based compound. One type of these may be used alone, or two or more types may be used in combination.

Among the above ultraviolet absorbers, it is preferable to use a compound having a benzophenone structure or a compound having a hydroxyphenyltriazine structure.

Each of the compounds has excellent compatibility with the above-mentioned (meth)acrylic resins and has a function of highly absorbing ultraviolet rays. Therefore, the hard coat layer 3 formed by the compound is more likely to satisfy the above-mentioned optical properties.

In particular, it is preferable that the hard coat layer 3 contains the compound having the benzophenone structure and the compound having the hydroxyphenyltriazine structure as the ultraviolet absorber.

This makes it possible to more remarkably exhibit the above-mentioned effects.

In the case where the hard coat layer 3 contains the compound having the benzophenone structure and the compound having the hydroxyphenyltriazine structure as the ultraviolet absorber, a ratio of a content of the compound having the benzophenone structure to a content of the compound having the hydroxyphenyltriazine structure in the hard coat layer 3 is preferably between 1.0:2.0 and 2.0:1.0, more preferably between 1.0:1.5 and 1.5:1.0, and even more preferably between 1.0:1.2 and 1.2:1.0 by mass ratio.

This makes it possible to more remarkably exhibit the above-mentioned effects.

Specific examples of the ultraviolet absorber include, for example, compounds represented by the following Formulas (2) to (13). Among these, from the viewpoint of more remarkably exhibiting the above-mentioned effects, the compounds represented by the following Formulas (8) to (13) are preferred.

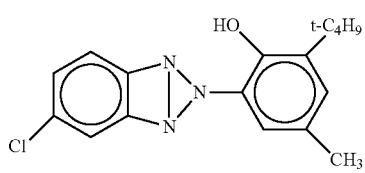

(2)

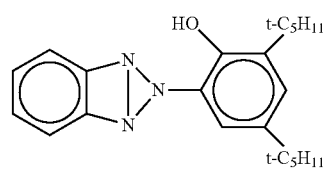

(3)

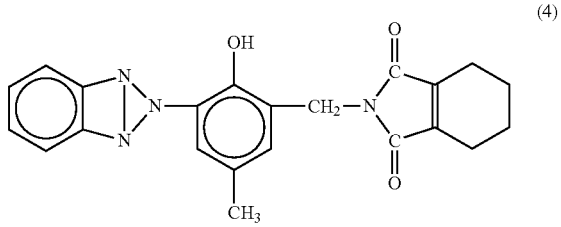

(4)

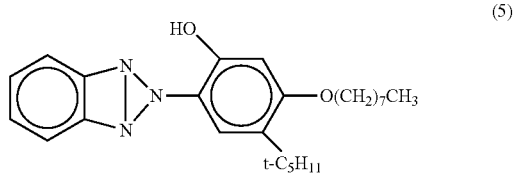

(5)

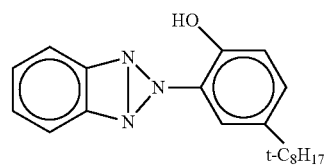

(6)

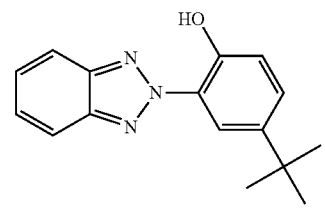

(7)

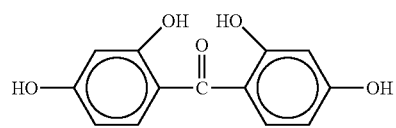

(8)

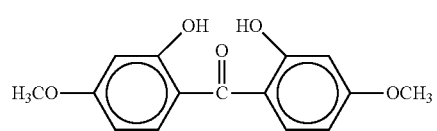

(9)

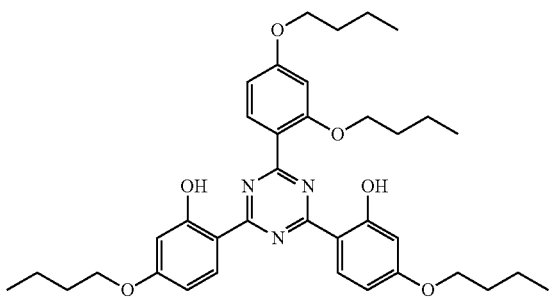

(10)

-continued

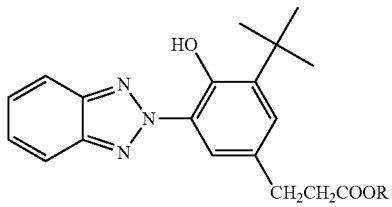
(11)

(In Formula (11), R is an alkyl group having a carbon number of 10 or more and a carbon number of 12 or less.)

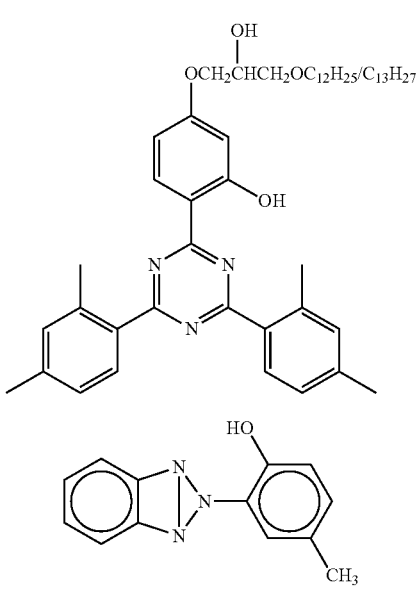

As commercially available products of the ultraviolet absorbents described above, for example, products under the trade names "Tinuvin (registered trademark) PS", "Tinuvin (registered trademark) 460", "Tinuvin (registered trademark) 477", "Tinuvin (registered trademark) 400", and "Tinuvin (registered trademark) 384-2" are commercially available from BASF corporation. Further, products under the trade names "SEESORB SB701", "SEESORB SB704", "SEESORB SB706", "SEESORB SB707", "SEESORB SB709", "SEESORB SB107", and "SEESORB SB106" are commercially available from SHIPRO KASEI corporation. Among these, from the viewpoint of more remarkably exhibiting the above-mentioned effects, "Tinuvin (registered trademark) 460", "Tinuvin (registered trademark) 477", "Tinuvin (registered trademark) 400", "SEESORB SB107", and "SEESORB SB106" are preferred.

As described above, the ultraviolet absorber is contained in the hard coat layer 3 in the proportion of 5.0 parts by mass or more and 30.0 parts by mass or less relative to 100.0 parts by mass of the (meth)acrylate-based resin. In this regard, the proportion of the ultraviolet absorber relative to 100.0 parts by mass of the (meth)acrylate-based resin is preferably 7.0 parts by mass or more and 28.0 parts by mass or less, more preferably 8.0 parts by mass or more and 25.0 parts by mass or less, and even more preferably 10.0 parts by mass or more and 20.0 parts by mass or less.

This makes it possible to more remarkably exhibit the above-mentioned effects of the present invention.

The content percentage of the ultraviolet absorber in the hard coat layer 3 is preferably 4.1% by mass or more and 22.7% by mass or less, more preferably 5.7% by mass or more and 21.4% by mass or less, and even more preferably 8.3% by mass or more and 16.0% by mass or less.

This makes it possible to more remarkably exhibit the above-mentioned effects of the present invention.

When the hard coat layer 3 contains a plurality of types of ultraviolet absorbers, the sum of the content percentages of these ultraviolet absorbers is considered as the content percentage of the ultraviolet absorber in the hard coat layer 3.

[1-2-4] Other Components

The hard coat layer 3 may contain components other than those described above. Hereinafter, in this section, such components are also referred to as "the other components".

Examples of such components include a resin component other than the (meth)acrylate-based resin, a light stabilizer other than the hindered amine light stabilizer, an antioxidant, a silane-based coupling agent, a leveling agent, an antistatic agent, and a defoamer.

In this regard, the proportion of the other components in the hard coat layer 3 is preferably 10% by mass or less, more preferably 5% by mass or less, and even more preferably 3% by mass or less.

[1-2-5] Other Conditions

The thickness of the hard coat layer 3 is not particularly limited, but is preferably 0.1 μm or more and 20 μm or less, more preferably 0.2 μm or more and 15 μm or less, and even more preferably 0.4 μm or more and 10 μm or less.

This suppresses the hard coat layer 3 from becoming excessively hard, while providing even better abrasion resistance to the hard coat layer 3. In addition, this improves ease of handling the exterior window film 1 and improves the workability such as applying the exterior window film 1 to an adherend. It is also possible to effectively prevent occurrence of cracks.

[1-3] Pressure-Sensitive Adhesive Layer

The pressure-sensitive adhesive layer 4 generally has excellent flexibility and is a part that adheres to an adherend.

Examples of a pressure-sensitive adhesive constituting the pressure-sensitive adhesive layer 4 include an acrylic-based pressure-sensitive adhesive, a natural rubber-based pressure-sensitive adhesive, a synthetic rubber-based pressure-sensitive adhesive, a polyvinyl ether-based pressure-sensitive adhesive, a urethane-based pressure-sensitive adhesive, and a silicone-based pressure-sensitive adhesive.

Among these, from the viewpoint of the weather resistance and the like, the acrylic-based pressure-sensitive adhesive, the urethane-based pressure-sensitive adhesive, and the silicone-based pressure-sensitive adhesive are particularly suitable.

Specific examples of the synthetic rubber-based pressure-sensitive adhesive include styrene-butadiene rubber, polyisobutylene rubber, isobutylene-isoprene, styrene-isoprene block copolymer, styrene-butadiene block copolymer, and styrene-ethylene-butylene block copolymer.

Specific examples of the acrylic-based pressure-sensitive adhesive include copolymers formed by polymerizing two or more of various polymerization components such as butyl (meth)acrylate, 2-ethylhexyl (meth)acrylate, isooctyl (meth)acrylate, methyl (meth)acrylate, hydroxyethyl (meth)acrylate, and hydroxybutyl (meth)acrylate.

Specific examples of the polyvinyl ether-based pressure-sensitive adhesive include polyvinyl ether and polyvinyl isobutyl ether.

Specific examples of the silicone-based pressure-sensitive adhesive include dimethylpolysiloxane and the like.

These pressure-sensitive adhesives can be used alone or in combination of two or more types.

The pressure-sensitive adhesive layer 4 is composed mainly of the pressure-sensitive adhesive and may contain components other than the pressure-sensitive adhesive.

Examples of such components include a ultraviolet absorber, a tackifier, a filler, a softener, an antioxidant, a light stabilizer, a crosslinking agent, a colorant, a modifier, a rust inhibitor, a flame retardant, a hydrolysis inhibitor, a surface lubricant, a corrosion inhibitor, a heat-resistant stabilizer, a lubricant, an antistatic agent, a polymerization inhibitor, a catalyst, a leveling agent, a thickener, a dispersant, and a defoamer.

The thickness of the pressure-sensitive adhesive layer 4 is not particularly limited, but is preferably, for example, 1 μm or more and 100 μm or less, more preferably 5 μm or more and 80 μm or less, and even more preferably 10 μm or more and 60 μm or less.

This results in the durability of the exterior window film 1, while improving the ease of handling the exterior window film 1, thereby facilitating installation (application) to an adherend. In addition, this improves the shape followability with respect to a curved adherend, effectively preventing occurrence of wrinkles and the like in the exterior window film 1.

[1-4] Other Conditions

The thickness (total thickness) of the exterior window film 1 is not particularly limited, but is preferably 11 μm or more and 400 μm or less, more preferably 18 μm or more and 230 μm or less, and even more preferably 20 μm or more and 100 μm or less.

This results in the durability and the better ultraviolet absorption capability of the exterior window film 1, while improving the handleability of the exterior window film 1, thereby facilitating a process such as application to an adherend. In addition, this improves the shape followability with respect to a curved adherend, effectively preventing occurrence of wrinkles and the like in the exterior window film 1.

Here, "total thickness" means the overall thickness of the exterior window film 1 in a state of being applied to an adherend. Thus, for example, even if a release liner 10 described below is disposed on the pressure-sensitive adhesive layer 4 during storage of the exterior window film 1, the thickness of the release liner 10 is not included in the total thickness.

The exterior window film 1 is preferably transparent so as not to impair the appearance of the adherend.

In this specification, "transparent" refers to that a transmittance in the visible light range is 60% or more (upper limit value 100%), and preferably 80% or more (upper limit value 100%). The transmittance of the exterior window film 1 can be measured by a method conforming to JIS A5759: 2016 (Films for building window glass—Visible light transmittance test).

The exterior window film 1 preferably has a yellowness index (YI) of 4 or less, more preferably 1 or more and 3.5 or less, and even more preferably 1.5 or more and 2.5 or less.

This results in the exterior window film 1 in which coloring is suppressed. As a result, the exterior window film 1 has excellent transparency and a colorless property. For this reason, the exterior window film 1 is suitably used as an exterior window film.

The yellowness index (YI) of the exterior window film 1 can be measured by a method conforming to JIS K 7373: 2006.

The haze of the exterior window film 1, measured in accordance with JIS K 7136:2000, is preferably close to the haze of the substrate 2 alone. The value of the haze of the exterior window film 1 is preferably 2.0% or less, more preferably 1.8% or less, and even more preferably 1.5% or less.

This allows the exterior window film 1 to have the excellent transparency.

[2] Release Liner

The release liner 10 may be disposed on the pressure-sensitive adhesive layer 4 of the exterior window film 1.

When the exterior window film 1 is applied to an adherend, the release liner 10 is peeled off from the pressure-sensitive adhesive layer 4.

The release liner 10 is not particularly limited and may have a configuration that is commonly used in the field of window films. For example, the release liner 10 may have a configuration in which a release layer is provided on a surface of a paper substrate or a resin film substrate.

Examples of materials constituting the resin film substrate include polyethylene terephthalate and polypropylene. Examples of materials constituting the paper substrate include polyethylene-laminated paper, polypropylene-laminated paper, clay-coated paper, resin-coated paper, glassine paper, and fine paper.

The release layer may have a configuration to contain a release agent such as a silicone, a long-chain alkyl-based resin, or a fluorine-based resin.

The thickness of the release liner 10 is not particularly limited, but is preferably, for example, 10 μm or more and 400 μm or less. Furthermore, when the release liner 10 has the configuration to include the above-mentioned release layer, the thickness of the release layer is preferably, for example, 0.01 μm or more and 5 μm or less.

[3] Method for Producing Window Film

Next, a method for producing the exterior window film will be described.

First, for example, the liquid composition (coating liquid) for forming the hard coat layer 3 is coated onto one surface side of the substrate 2 to form the hard coat layer 3. Next, the liquid composition (coating liquid) for forming the pressure-sensitive adhesive layer 4 is coated onto the other surface side of the substrate 2 to form the pressure-sensitive adhesive layer 4. In this way, the exterior window film 1 can be produced. In such a method, the order of forming the hard coat layer 3 and the pressure-sensitive adhesive layer 4 is not particularly limited.

The liquid composition for forming the hard coat layer 3 may be coated by a known method, such as a bar coating method, a knife coating method, a roll coating method, a blade coating method, a die coating method, or a gravure coating method.

The pressure-sensitive adhesive layer 4 can be formed by irradiating the liquid composition for forming the pressure-sensitive adhesive layer 4 coated onto the substrate 2 with ultraviolet radiation or electron beams to be cured, or by heating the liquid composition to be cured.

It is preferable that the liquid composition for forming the hard coat layer 3 further contains the photopolymerization initiator as described above, from the viewpoint of shortening the polymerization time by light irradiation and reducing the amount of light irradiation when forming the hard coat layer 3.

In other words, the (meth)acrylate-based resin preferably has a polymerized structure of the urethane (meth)acrylate by the above-mentioned photopolymerization initiator.

The content of the photopolymerization initiator in the liquid composition for forming the hard coat layer 3 is preferably 0.05 parts by mass or more and 15.0 parts by mass or less, more preferably 0.1 parts by mass or more and 10.0 parts by mass or less, and even more preferably 0.3 parts by mass or more and 5.0 parts by mass or less, relative to 100.0 parts by mass of the urethane (meth)acrylate.

This makes it possible to more remarkably exhibit the above-mentioned effects.

As needed, the liquid composition for forming the hard coat layer 3 may contain components other than those described above. Examples of such components include a thermosetting catalyst, a solvent, and the like.

The liquid composition for forming the pressure-sensitive adhesive layer 4 can be obtained by dissolving or suspending the above-mentioned materials constituting the pressure-sensitive adhesive layer 4 in an appropriate solvent. Examples of solvents include esters such as ethyl acetate or butyl acetate; ketones such as methyl isobutyl ketone, methyl ethyl ketone, or cyclohexanone; and aromatic hydrocarbons such as toluene or xylene. One or more selected from these can be used in combination.

The liquid composition for forming the pressure-sensitive adhesive layer 4 may be coated by a known method, for example, a method of using various coaters such as an air knife coater, a blade coater, a bar coater, a gravure coater, a roll coater, a roll knife coater, a curtain coater, a die coater, a knife coater, a screen coater, a Mayer bar coater, and a kiss coater.

The coating amount of the liquid composition for forming the pressure-sensitive adhesive layer 4 may be adjusted appropriately so that the thickness of the pressure-sensitive adhesive layer 4 after drying is within the above-mentioned range. The drying conditions for the liquid composition for forming the pressure-sensitive adhesive layer 4 are not particularly limited. However, the drying temperature may be, for example, 70° C. or higher and 130° C. or lower, and the drying time may be, for example, 1 minute or more and 5 minutes or less.

In this way, the exterior window film 1 can be obtained.

The release liner 10 may be further laminated on the pressure-sensitive adhesive layer 4 of the exterior window film 1.

[4] Adherend

Next, an adherend to which the exterior window film 1 is applied will be described.

The exterior window film 1 is suitably used to a window glass of building structures such as houses and buildings, and vehicles such as automobiles and trains.

In particular, the exterior window film 1 according to the present invention is applied to an exterior surface of a window glass. With such an exterior window film 1, sunlight hits the hard coat layer 3/the substrate 2/the pressure-sensitive adhesive layer 4/the window glass/the interior in this order. Therefore, the hard coat layer 3 can block ultraviolet rays, suitably suppressing the deterioration of the hard coat layer 3. It is also possible to suitably suppress the deterioration of the substrate 2 and the pressure-sensitive adhesive layer 4 due to ultraviolet rays. Furthermore, it is possible to suitably suppress the deterioration due to rain, wind, changes in temperature and the like, in addition to ultraviolet rays.

In this way, the exterior window film 1 has the excellent weather resistance. For this reason, the exterior window film 1 can be used favorably as an exterior window film which is provided in a severer environment than an interior window film.

[5] Method for Applying Window Film

Next, a method for applying the exterior window film 1 will be described.

A case where the exterior window film 1 is applied to an adherend such as a window glass will be described. When the exterior window film 1 has the release liner 10, the release liner 10 is first peeled off to expose the pressure-sensitive adhesive layer 4. The pressure-sensitive adhesive layer 4 is then adhered to the adherend, thereby allowing the exterior window film 1 to be applied to the adherend. This application can be performed, for example, by a method called wet application. The wet application can be performed by interposing an installation liquid containing water added with a surfactant into the interface between the pressure-sensitive adhesive layer 4 and the adherend, applying the pressure-sensitive adhesive layer 4 to the adherend, and then scraping the installation liquid therefrom using a tool called a squeegee.

Although the preferred embodiments according to the present invention have been described above, the present invention is not limited to these.

For example, the exterior window film may have a configuration other than those described above. More specifically, for example, at least one intermediate layer may be provided between the substrate and the pressure-sensitive adhesive layer or between the substrate and the hard coat layer. Further, at least one coating layer may be provided on the outer surface side of the hard coat layer.

Furthermore, the exterior window film according to the present invention may be produced by any method and is not limited to the production method described above.

For example, the exterior window film according to the present invention may be produced by using a transfer method. Specifically, first, the composition for forming the pressure-sensitive adhesive layer is coated onto one surface side of the release liner to form the pressure-sensitive adhesive layer. Then, the release liner with the pressure-sensitive adhesive layer formed thereon is bonded to the substrate. In this way, the exterior window film can be produced by using the transfer method.

EXAMPLES

The present invention will be described in detail below based on specific examples, but the present invention is not limited thereto. In the following examples, treatments and measurements for which temperature conditions are not specified were performed at room temperature (23° C.).

[6] Production of Exterior Window Film

Example 1

First, the liquid composition (coating liquid) for forming a hard coat layer was prepared using Beamset 575CB (Arakawa Chemical Industries Co., Ltd.) containing a urethane acrylate, Tinuvin 292 (BASF Co., Ltd.) as a hindered amine light stabilizer, UV-24 (Solvay Co., Ltd.) as a benzophenone-based ultraviolet absorber, Tinuvin 477 (BASF Co., Ltd.) as a ultraviolet absorber, Omnirad TPO (IGM Resins Co., Ltd.) as a photopolymerization initiator, and methyl ethyl ketone as a solvent.

Tinuvin 292 whose structure is shown below is a mixture of bis(1,2,2,6,6-pentamethyl-4-piperidyl)sebacate and methyl 1,2,2,6,6-pentamethyl-4-piperidyl)sebacate.

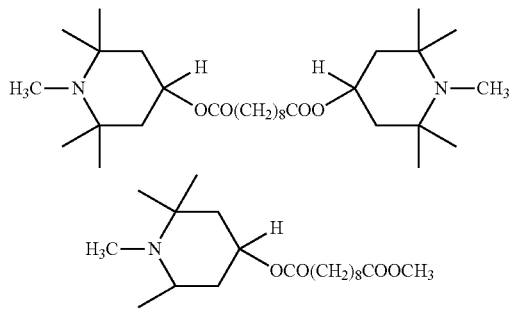

UV-24 is 2,2'-dihydroxy-4-methoxybenzophenone.

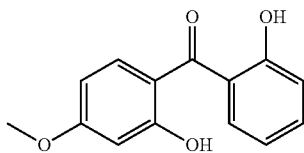 [SMILES: COc1ccc(C(=O)c2ccccc2O)c(O)c1]

Tinuvin 477 is a mixture of a hydroxyphenyltriazine-based ultraviolet absorber and 2-methoxy-1-methylethyl acetate.

Omnirad TPO whose structure is shown below is 2,4,6-trimethylbenzoyldiphenylphosphine oxide.

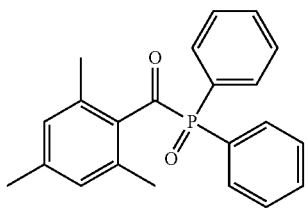 [SMILES: Cc1cc(C)c(C(=O)P(=O)(c2ccccc2)c2ccccc2)c(C)c1]

The liquid composition for forming the hard coat layer as described above was coated onto one surface of the substrate using the bar coating method while adjusting the coating amount so that the film thickness after curing was 2.5 μm, resulting in a coating film. The coating film was irradiated with ultraviolet radiation having an integrated light intensity of 200 mJ/cm². As a result, the hard coat layer was formed.

As the substrate, a polyethylene terephthalate film (Toyobo Ester (registered trademark) film HB3, manufactured by Toyobo Co., Ltd.) containing an ultraviolet absorber and having a thickness of 50 μm was used.

Next, a solution of an acrylic-based pressure-sensitive adhesive (100 parts by mass of a copolymer (weight average molecular weight 600,000) of butyl acrylate/acrylic acid=90 parts by mass/10 parts by mass, and 1 part by mass of an isocyanate-based crosslinking agent) was coated onto the opposite surface of the substrate from the surface provided with the hard coat layer so as to have a thickness of 25 μm after drying, resulting in a coating film. The coating film was dried at 100° C. for 1 minute to form a pressure-sensitive adhesive layer. As a result, the exterior window film was produced. Furthermore, a release liner having a thickness of 38 μm was laminated on the pressure-sensitive adhesive layer of the exterior window film.

Examples 2 and 3

Exterior window films were produced in the same manner as in Example 1, except that usage of each component in the liquid composition for forming the hard coat layer was changed so that the content of each component satisfied the relationship shown in Table 1.

Comparative Examples 1 to 6

Exterior window films were produced in the same manner as in Example 1, except that usage of each component in the liquid composition for forming the hard coat layer was changed so that the content of each component satisfied the relationship shown in Table 1.

[7] Evaluations of Exterior Window Film

The following evaluations were carried out on the obtained exterior window film.

[7-1] Weather Resistance Test of Hard Coat Layer

An accelerated weather resistance test was performed using a sunshine weather meter.

Each of the obtained exterior window films was applied to a glass plate. The glass plate was then placed in the sunshine weather meter and subjected to the accelerated weather resistance test in which the glass plate was exposed to conditions of irradiance of 255 W/m² (300 to 400 nm), black panel temperature of 63° C., and humidity of 50 RH % for 1,000 hours.

The surface of the hard coat layer was visually observed to evaluate the presence or absence of cracks.
A: Absence of cracks
B: Presence of cracks

[7-2] Crack Resistance Test of Hard Coat Layer

Each of the obtained exterior window films was wound into a roll shape around a cylindrical core having an outer diameter of 20 mm so that the hard coat layer was on the outside.

The core was removed therefrom, and a needle was pressed into the hard coat layer by 10 mm. At that time, the folded surface of the hard coat layer was visually observed to evaluate the presence or absence of cracks.
A: Absence of cracks
B: Presence of cracks

[7-3] Haze of Exterior Window Film

The haze of each of the obtained exterior window films was measured using a haze meter (NIPPON DENSHOKU INDUSTRIES CO., LTD., NDH-5000) in accordance with JIS K7136:2000.

The smaller this value, the more transparent the exterior window film is.

Table 1 shows the results of the above evaluations for each of the Examples and Comparative Examples, together with the conditions of the composition used to form the hard coat layer. In Table 1, the unit of the content of each component is parts by mass. Each of the content of the hindered amine light stabilizer and the content of the ultraviolet absorber was shown as a proportion relative to 100.0 parts by mass of the urethane acrylate contained in the formed hard coat layer. The content of the photopolymerization initiator was shown as a proportion relative to 100.0 parts by mass of the urethane (meth)acrylate contained in the liquid composition for forming the hard coat layer.

TABLE 1

| | Content | | | | Evaluations | | |
|---|---|---|---|---|---|---|---|
| | Urethane acrylate 575CB | Ultraviolet absorber | | Hindered amine light stabilizer Tinuvin 292 | Photo-polymerization initiator Omnirad TPO | Weather resistance | Crack resistance | Haze |
| | | UV-24 | Tinuvin 477 | | | | | |
| Example 1 | 100.0 | 5.0 | 5.0 | 5.0 | 1.5 | A | A | 1.87 |
| Example 2 | 100.0 | 5.0 | 5.0 | 10.0 | 1.5 | A | A | 1.50 |
| Example 3 | 100.0 | 10.0 | 10.0 | 10.0 | 2.0 | A | A | 1.33 |
| Comparative Example 1 | 100.0 | None | None | None | None | B | A | 35.50 |
| Comparative Example 2 | 100.0 | 1.0 | 1.0 | None | None | B | A | 23.23 |
| Comparative Example 3 | 100.0 | 5.0 | 5.0 | None | 1.5 | B | A | 17.17 |
| Comparative Example 4 | 100.0 | 10.0 | 10.0 | None | 2.0 | B | A | 9.82 |
| Comparative Example 5 | 100.0 | 1.0 | 1.0 | 1.0 | None | B | A | 3.67 |
| Comparative Example 6 | 100.0 | 5.0 | 5.0 | 1.0 | 1.5 | B | A | 3.00 |

As is clear from Table 1, good results were obtained in the weather resistance, the crack resistance, and the haze of the hard coat layer in each of Examples 1 to 3.

In contrast, satisfactory results were not obtained in each of the Comparative Examples.

More specifically, in Comparative Examples 2 to 4, in which the hard coat layer did not contain the hindered amine light stabilizer, cracks occurred after the weather resistance test and the haze was also large. Further, in Comparative Example 1, which did not contain both the hindered amine light stabilizer and the ultraviolet absorber, the haze was even larger. Furthermore, in Comparative Examples 5 and 6, which contained both the hindered amine light stabilizer and the ultraviolet absorber but had a low content of the hindered amine light stabilizer, sufficient results were not obtained.

FIGS. 2, 3, 4, and 5 show micrographs of the surfaces of the exterior window films of Example 1 and Comparative Examples 1, 3, and 6, respectively, after performing the accelerated weather resistance test of 1,000 hours.

Figure 6:
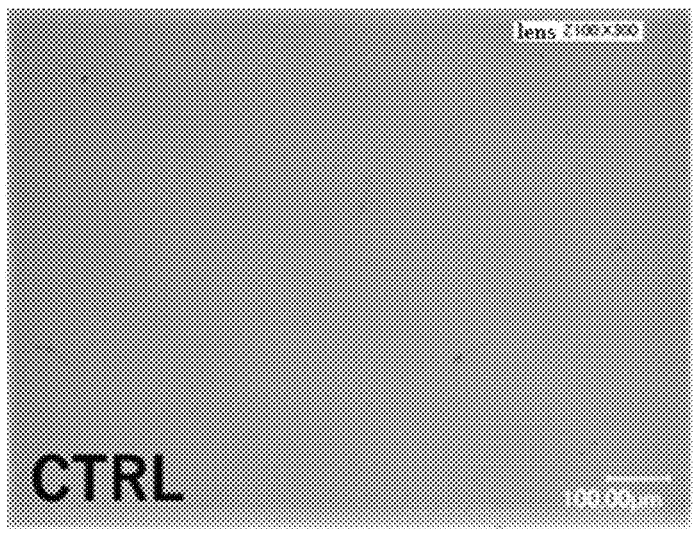
FIG. 6 is a micrograph of a surface of the exterior window film of Comparative Example 1 before performing the accelerated weather resistance test.

FIG. 6 shows a micrograph of the surface of the exterior window film of Comparative Example 1 before performing the accelerated weather resistance test.

It is understood that no occurrence of cracks was observed in Example 1, but occurrence of cracks was observed in Comparative Examples 1, 3, and 6.

Exterior window films were produced in the same manner as above, except that in the preparation of the liquid composition for forming the hard coat layer, the proportion of the hindered amine light stabilizer and the proportion of the ultraviolet absorber relative to the (meth)acrylate-based resin in the liquid composition for forming the hard coat layer were variously changed so that the proportion of the hindered amine light stabilizer relative to 100.0 parts by mass of the (meth)acrylate-based resin in the hard coat layer to be formed was variously changed within the range of 2.0 parts by mass or more and 15.0 parts by mass or less, and the proportion of the ultraviolet absorber relative to 100.0 parts by mass of the (meth)acrylate-based resin in the hard coat layer to be formed was variously changed within the range of 5.0 parts by mass or more and 30.0 parts by mass or less, and the evaluations were performed in the same manner as above. As a result, the similar results to those described above were obtained.

In addition, exterior window films were produced in the same manner as above, except that the mixing ratio of the ultraviolet absorber having the benzophenone structure (UV-24) to the ultraviolet absorber having the hydroxyphenyltriazine structure (Tinuvin 477) in the hard coat layer was variously changed within the range of between 1.0:2.0 and 2.0:1.0 by mass ratio, and the evaluations were performed in the same manner as above. As a result, the similar results to those described above were obtained.

In addition, exterior window films were produced in the same manner as above, except that the thickness of the hard coat layer was variously changed within the range of 0.1 μm or more and 20 μm or less, and the evaluations were performed in the same manner as above. As a result, the similar results to those described above were obtained.

INDUSTRIAL APPLICABILITY

According to the present invention, it is possible to provide an exterior window film with a hard coat layer, the exterior window film having excellent weather resistance, preventing occurrence of cracks in the hard coat layer when wound into a roll shape, and ensuring transparency. Therefore, the present invention has industrial applicability.

EXPLANATION OF REFERENCE NUMERAL

1: Exterior window film
2: Substrate
3: Hard coat layer
4: Pressure-sensitive adhesive layer
10: Release liner

What is claimed is:
1. An exterior window film comprising:
a substrate; a hard coat layer provided on one surface side of the substrate; and a pressure-sensitive adhesive layer provided on the opposite surface side of the substrate from the side provided with the hard coat layer,
wherein the hard coat layer is composed of a material containing a (meth)acrylate-based resin having a ure- thane (meth)acrylate as a constituent component, a hindered amine light stabilizer, and an ultraviolet absorber, and wherein relative to 100.0 parts by mass of the (meth)acrylate-based resin, a proportion of the hindered amine light stabilizer is 2.0 parts by mass or more and 15.0 parts by mass or less, and a proportion of the ultraviolet absorber is 5.0 parts by mass or more and 30.0 parts by mass or less.

2. The exterior window film as claimed in claim 1, wherein the hard coat layer contains a compound having a benzophenone structure and a compound having a hydroxyphenyltriazine structure as the ultraviolet absorber.

3. The exterior window film as claimed in claim 2, wherein a ratio of a content of the compound having the benzophenone structure to a content of the compound having the hydroxyphenyltriazine structure in the hard coat layer is between 1.0:2.0 and 2.0:1.0 by mass ratio.

4. The exterior window film as claimed in claim 1, wherein the (meth)acrylate-based resin has a polymerized structure of the urethane (meth)acrylate by a photopolymerization initiator.

5. The exterior window film as claimed in claim 4, wherein the photopolymerization initiator is a triphenylphosphine oxide-based compound.

6. The exterior window film as claimed in claim 1, wherein the hard coat layer has a thickness of 0.1 µm or more and 20 µm or less.

7. The exterior window film as claimed in claim 1, wherein the substrate is composed of a material containing polyester.

8. The exterior window film as claimed in claim 2, wherein the (meth)acrylate-based resin has a polymerized structure of the urethane (meth)acrylate by a photopolymerization initiator.

9. The exterior window film as claimed in claim 8, wherein the photopolymerization initiator is a triphenylphosphine oxide-based compound.

10. The exterior window film as claimed in claim 3, wherein the (meth)acrylate-based resin has a polymerized structure of the urethane (meth)acrylate by a photopolymerization initiator.

11. The exterior window film as claimed in claim 10, wherein the photopolymerization initiator is a triphenylphosphine oxide-based compound.

* * * * *